United States Patent
Kamineni et al.

(10) Patent No.: US 10,448,227 B2
(45) Date of Patent: Oct. 15, 2019

(54) MOBILE DATABASE ACCESS APPLICATION DEVELOPMENT SYSTEM AND METHOD

(71) Applicants: Hari P. Kamineni, Irving, TX (US); Sundeep V. Ravande, Houston, TX (US)

(72) Inventors: Hari P. Kamineni, Irving, TX (US); Sundeep V. Ravande, Houston, TX (US)

(73) Assignee: Innovapptive, Inc, Houston, TX (US)

(*) Notice: Subject to any disclaimer, the term of this patent is extended or adjusted under 35 U.S.C. 154(b) by 74 days.

(21) Appl. No.: 15/475,780

(22) Filed: Mar. 31, 2017

(65) Prior Publication Data

US 2017/0289731 A1 Oct. 5, 2017

Related U.S. Application Data

(60) Provisional application No. 62/316,107, filed on Mar. 31, 2016.

(51) Int. Cl.

| | |
|---|---|
| *G06F 9/44* | (2018.01) |
| *H04W 4/60* | (2018.01) |
| *G06F 8/38* | (2018.01) |
| G06F 8/71 | (2018.01) |
| G06F 9/451 | (2018.01) |
| H04L 12/24 | (2006.01) |
| H04W 8/24 | (2009.01) |

(52) U.S. Cl.
CPC .............. *H04W 4/60* (2018.02); *G06F 8/38* (2013.01); *G06F 8/71* (2013.01); *G06F 9/451* (2018.02); *H04L 41/22* (2013.01); *H04W 8/245* (2013.01)

(58) Field of Classification Search
CPC ... G06F 8/38; G06F 8/71; G06F 9/451; G06F 9/44505; H04L 41/22
See application file for complete search history.

(56) References Cited

U.S. PATENT DOCUMENTS

| | | | |
|---|---|---|---|
| 2013/0332863 A1* | 12/2013 | Wilson | G06F 9/451 715/762 |
| 2015/0161235 A1* | 6/2015 | Libfeld | G06F 17/3056 707/607 |
| 2016/0364130 A1* | 12/2016 | Wolff-Petersen | G06F 9/4411 |
| 2017/0060383 A1* | 3/2017 | Gomez | H04L 41/082 |

OTHER PUBLICATIONS

Gregor Broll and Doris Hausen, Mobile and Physical User Interfaces for NFC-based Mobile Interaction with Multiple Tags, ACM, 2010, retrieved online on Jul. 17, 2019, pp. 133-142. Retrieved from the Internet: <URL: http://delivery.acm.org/10.1145/1860000/1851624/p133-broll.pdf?>. (Year: 2010).*

* cited by examiner

*Primary Examiner* — Hanh Thi-Minh Bui
(74) *Attorney, Agent, or Firm* — Tysver Beck Evans

(57) ABSTRACT

A system and method are presented that provide a configuration tool on a database gateway. The configuration tool stores configuration data that is used by a mobile app to customize the mobile application user interface. Changes made to the configuration data are accessed by each mobile application to revise the user interface of the mobile application. In one embodiment, the database gateway is an OData gateway that is used by the mobile device to communicate with the database.

20 Claims, 9 Drawing Sheets

MOBILE DATABASE ACCESS APPLICATION DEVELOPMENT SYSTEM AND METHOD

FIELD OF THE INVENTION

The present invention relates to the field of accessing centrally stored databases through apps running on mobile devices or on a web app operating on a desktop browser. More particularly, the invention relates to a method and apparatus for developing and configuring native mobile and desktop web database apps using a centrally located configuration tool.

SUMMARY

Centrally stored databases, such as those provided by SAP SE (Walldorf, Baden-Württemberg, Germany) or Oracle Corp. (Redwood City, Calif.), provide tremendous power for the maintenance, manipulation, storage, and reporting of data. To access this power through a mobile device, it is generally required to custom program a mobile application. The mobile application interacts with the centrally stored database, performing queries, displaying data, and accepting data input. Many standard database applications provide mobile application user interfaces to access this data.

However, it can be very difficult to make changes to a mobile application. Even changes that merely impact the mobile app's interface, such as a change in the data fields shown to a user, require significant changes to the underlying application code. Because of the specialized skillsets required to implement the changes (such as knowledge of SAP ABAP and OData services, and development experience on iOS, Android and Windows platforms), the cost to hire programmers to make these changes can be prohibitive.

The present invention provides a solution that allows enterprises to modify the user interface of mobile apps without changing the application code, while dynamically generating the web services for create, read, update and delete (CRUD) actions, without requiring programming knowledge or other database development skills.

The present application provides a configuration tool that creates configuration data that is easily modifiable. The information in this configuration tool is shared with the mobile app, which uses this configuration data to customize the mobile application user interface and it also dynamically generates the web services for create, read, update and delete (CRUD) actions. Changes made to the configuration data are automatically accessed by all mobile applications, which automatically changes the user interface. In one embodiment, the configuration data is stored in tables that are deployed and managed on OData gateway, (a Java deployable engine or SAP Netweaver Gateway).

DETAILED DESCRIPTION

Overview

Figure 1:
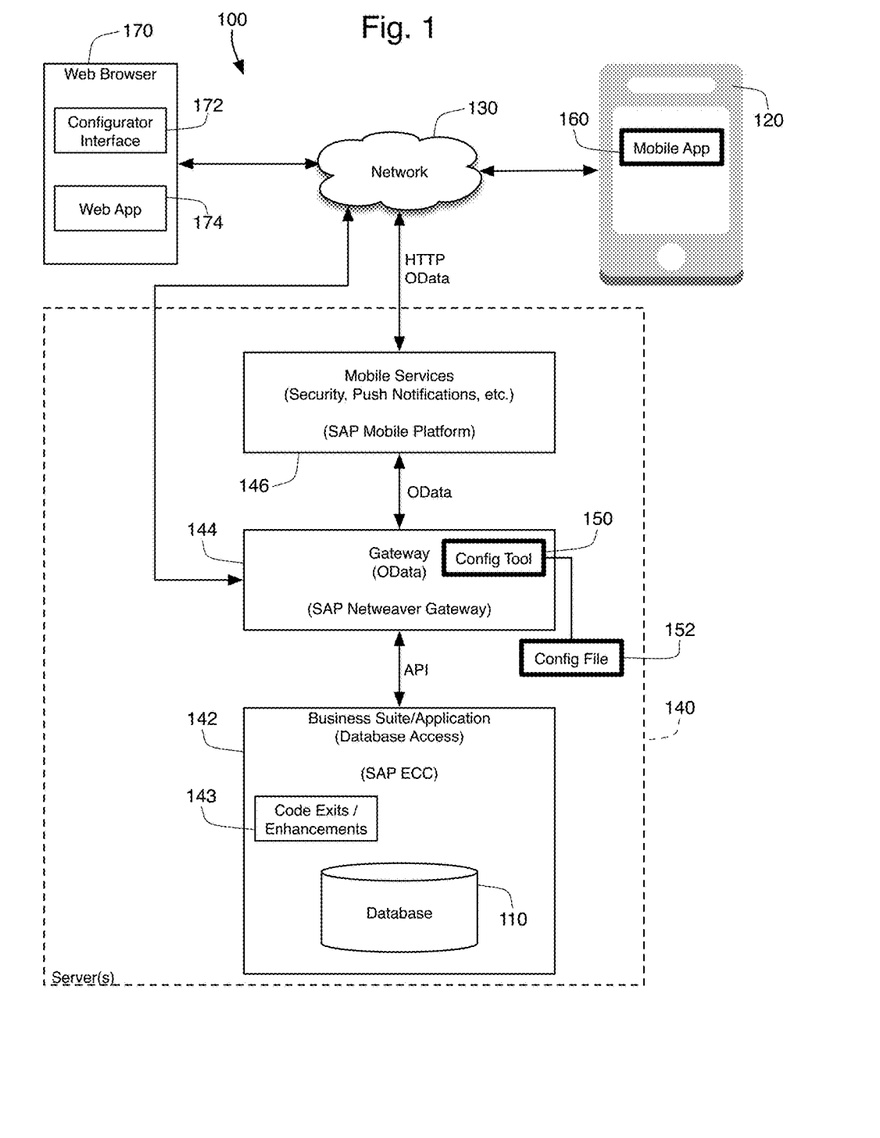
FIG. 1 is a schematic view of an environment used by one embodiment of the present invention.

FIG. 1 shows a computerized network environment 100 utilizing one embodiment of the present invention. This environment is primarily designed to provide access to data through a mobile device 120 over a wide area network 130. The data is stored in a database 110 that may be configured according to protocols developed by Oracle Corp. or other companies. In most cases, the mobile device 120 connects to the database 110 by connecting to one or more server computers 140 that provide access to the database 110. In an SAP configuration, the servers 140 operate one or more SAP applications or services. In FIG. 1, the database 110 is directly accessed and controlled by an SAP business application (or suite of applications) 142. The business application 142 may be, for example, SAP's Enterprise Resource Planning software, or at least the "central component" of this software, which is known as the ERP Central Component or ECC).

In FIG. 1, the business database application 142 communicates with a gateway server 144 that provides a standardized interface to the business application. The gateway shown in FIG. 1 is a OData gateway that provides OData (or "Open Data Protocol") services to the underlying databases. OData is a protocol that supports create, read, update, and delete operations for creating and consuming data application interfaces over HTTP/HTTPS or many other protocols. The gateway 144 communicates with the business application 142 through one or more application programming interfaces (APIs) provided by the business application 142. In the SAP environment, the gateway 144 may take the form of an SAP NetWeaver Gateway 144, which is an integration and application platform provided by SAP to simplify the programming of user interaction with underlying SAP application 142 and database 110.

In one embodiment, the gateway 144 communicates with outside devices (such as mobile device 120) through an intermediate platform that provides mobile services. In the SAP environment, this is the SAP Mobile Platform 146. This integration platform 146 provides mobile services beyond that provided by the OData gateway 144, including security protocols, offline capability and the ability to provide notifications.

In FIG. 1, a configuration tool 150 operates on the gateway 144 and communicates with an adaptable app 160 that operates on the mobile device 120. Together, these components 150, 160 make it easy to configure the mobile app on the fly in order to satisfy a client's specific needs. The configuration tool 150 sits within the gateway 144 and controls the web services that are provided therein. When operating on a SAP NetWeaver Gateway 144, this tool 150 sits within a namespace and is considered an "Add-On" to the NetWeaver Gateway 144. The configuration tool 150 dynamically adjusts data passed between the gateway 144, and the mobile app 160, and/or between the gateway 144 and the desktop web browser app 174. The configuration tool 150 keeps a list of all the tables, data elements, web services and other components that each application 160 and 174 needs to access data 110, and stores this information in a configuration file 152.

In one embodiment, the business application 142 includes custom programmed enhancements or "code exits." In the SAP context, a code exit 143 is referred to as Business Ad-In (or "BADI"). These enhancements 143 take the form of custom programming designed to provide additional functionality to the business application 142. In one embodiment, the configuration tool 150 is also able to monitor and control activation of these code exits 143. Whether or not a particular mobile device application 160 should utilize a particular code exit 143 will then be stored in configuration file 152.

The configuration tool 150 is managed by an external interface that is accessed from outside the servers 140, such as through a web browser 170 operating on an external computer system. A configurator interface 172 is provided through this browser 170 to allow administrative users to modify the mobile application 160 and the browser app 174. These modifications may include, for instance, adding or removing access to specific modules that provide certain web service functions, adding or removing specific fields from the screens presented on the mobile application 160 and desktop web application 174, and changing how data is displayed by the application 174 on web browser 170 and application 160 on the mobile device 120. The configuration technology provided by elements 150, 160, 174 reduces implementation time for modifications because the users never need to access code.

Once the configurator interface 172 has specified a configuration and the configuration tool 150 has stored in this information in the configuration file 152, the configuration tool 150, the mobile app 160, and the desktop web app 174 work together to implement this configuration. To allow this, the apps 160, 174 are pre-programmed to receive updated configurations, store the updated configuration, and then operate in accordance with this configuration. An unconfigured app 160, 174 will communicate a request for a configuration to the configuration tool 150. The configuration tool 150 will identify the mobile app 160 (or the user of the mobile app 160) and/or the desktop web browser app 174 (or the user of the desktop web browser app 174), identify an appropriate configuration in the configuration file 150 for that app 160, 174, and return that configuration to the app 160, 174. The mobile app 160 and desktop web browser app 174 are programmed to receive and store the configuration, and then communicate with the business application 142 and the database 110 according to that configuration. Data requests, for instance, will be made by the mobile app 160 or desktop web browser app 174 in accordance with its configuration. The request (using OData formatting) will pass through the mobile services platform 146 and to the gateway 144. The gateway 144 will analyze the OData request and convert the request into the appropriate API commands for the business application 142. The application 142 receives the data request, queries the database 110 and formats the reply, and responds back to the gateway 144 through its API. The gateway 144 sends the reply using OData through the mobile platform 146 to the mobile app 160 and desktop web browser app 174, which then display the data according to the stored configuration. Modification to existing data on database 110 and the entry of new data through the desktop web browser app 174 and mobile app 160 follows a similar pathway.

At any point, an administrative user may decide to modify the desktop web browser app 174 and mobile app 160 simultaneously. For instance, an administrator for an insurance company may decide to improve the interface on the mobile applications used by its salesforce out in the field. This is accomplished through the configurator interface 172, and the new configuration for the salesforce is stored in the configuration file 152. By locating the configuration tool 150 on the gateway 144, the configuration tool 150 can monitor communications made by the desktop web browser app 174 and mobile app 160 with the database 110. When the app 160, 174 runs and accesses the configuration tool 150 in run-time, it re-configures itself, based on the configuration changes noticed in the configuration tool 150. In the embodiment shown in FIG. 1, the app 160, 174 retrieves the configuration from the configuration tool 150 through the OData stream it maintains with the servers 140.

Interface Components 200

Figure 2:
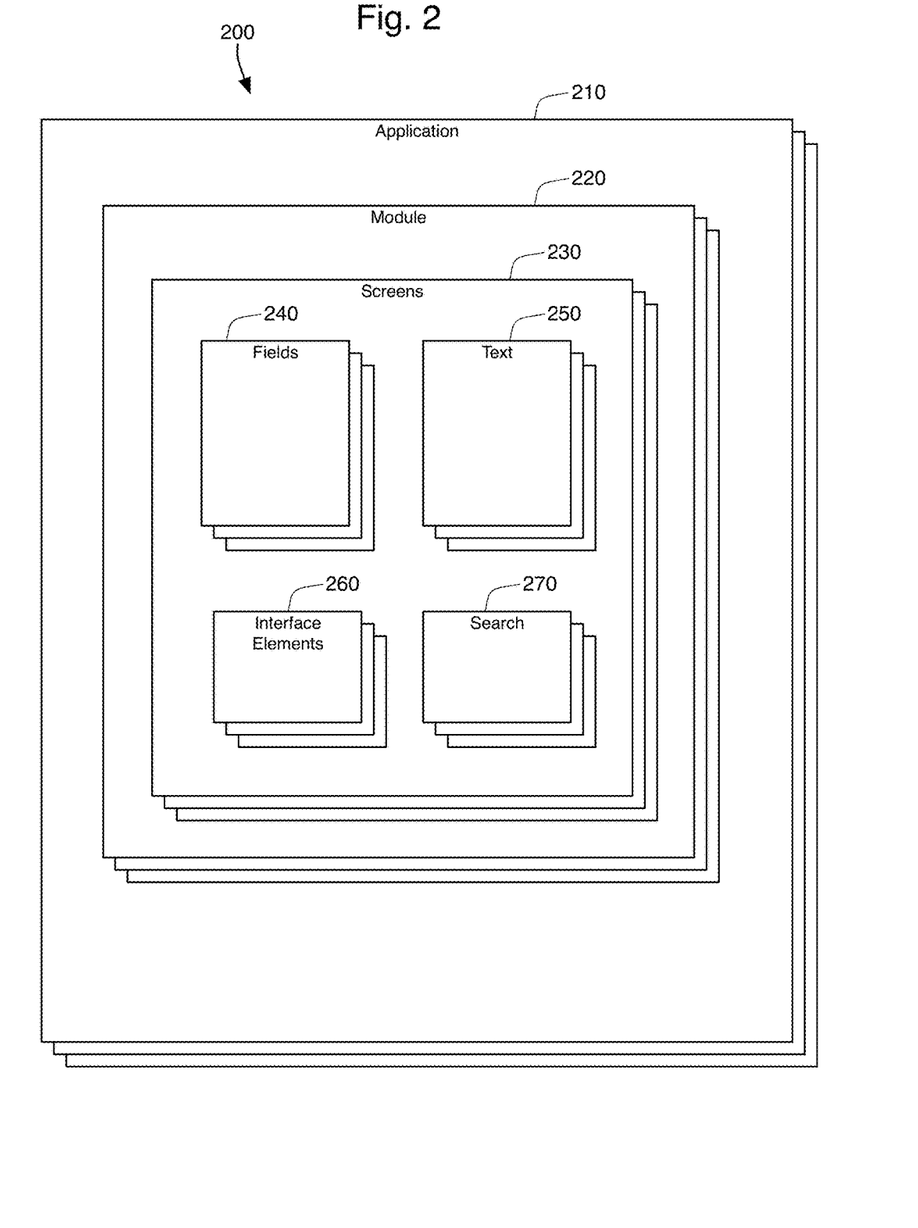
FIG. 2 is a schematic view of the elements in a mobile device user interface.

FIG. 2 shows the various components 200 of a user interface for the desktop web browser app 174 and mobile app 160 that can be used and defined in one embodiment of the present invention. The components 200 shown in FIG. 2 do not have to be defined, subdivided, and/or implemented in the exact manner described herein in order to implement the present invention. However, understanding of these example components 200 is useful in understanding how the present invention can be implemented.

In the preferred embodiment, the configuration tool 150 is implemented in a universal manner that can handle data processing and configuration for multiple mobile device applications 160 and desktop web browser app 174 simultaneously. These applications are represented in FIG. 2 by the outer rectangle 210. FIG. 2 is shown with three applications 210, which represents that multiple applications 210 can coexist and be managed by the configuration tool 150. A single application 210 may be operating on hundreds of different mobile devices 120 simultaneously. Using the configuration approach of the present invention, an application 210 can be reconfigured once, and each of the mobile devices 120 running that application 210 will be updated through the configuration tool 150 to operate the new configuration for the application 210. Alternatively, the mobile devices 120 operating a single application 210 can be subdivided into groups, with each group running a separate configuration for the application 210. In one embodiment, each mobile device 120 could even operate a separate, personalized configuration for the application 210. This personalized configuration can be considered in the abstract as a separate "application" 210, or a single application 210 can be considered to have multiple configurations associated therewith.

Each of the applications 210 in FIG. 2 contain (or "implement") one or more modules 220. These modules 220 can be considered a functional subcomponent of the application 210 that is designed to allow a user to complete one or more business functions. Alternatively, each module 220 can be considered a grouping of one or more interface screens 230. In one embodiment, a module 220 incorporates interface screens 230 that are designed to operate together to achieve a business function. Each screen 230 is a single user interface that might be provided on the mobile device 120 at a single time. A screen 230 may be larger than the display of the mobile device 120, requiring that the user scroll up/down or left/right to see the entire screen 230. A screen 230 will contain data fields 240, text elements 250, and interface elements 260. A data field 240 is typically associated with a field of a data table, or data element that is stored on an object or other data construct within the database 110. It is not necessary that there be a one-to-one correspondence between the fields 240 on a screen 230 and a pre-defined field in the database 110, although this may commonly be the case. Each field element 240 may define authentication and validity rules for that field, or may define user interface elements (e.g., check boxes or pull-down lists) for that field. The text elements 250 may be instructions, legal disclaimers, binding contractual language, or any other text element 250 that may appear on a screen 230. Other interface elements 260 can be defined for a screen 230, such as template colors and fonts, background images, graphical elements, transitions to other screens, etc. FIG. 2 also shows that search interfaces 270 can be defined for a screen to allow a user to search for and discover one or more data elements.

Even though an application 210 may include all of these elements 220, 230, 240, 250, 260, and 270, not all users of the application 210 need to use exactly the same elements 200. The goal of the configuration tool 150 is to modify the configuration of an application 210 to meet the needs of a particular user without the need to reprogram the app 210. As a result, the configuration file 152 is designed to indicate, for instance, that some users not see some of the modules 220 for an application 210, or some of the screens 230 for a module 220, or even some of the fields 240 for a screen. Furthermore, the preferred embodiment defines application configurations for groups of users. This allows, for example, all users in an organization to receive a configuration of an application 210 by default, while still allowing individual or subsets of users to access modified configurations for that application 210.

Configuration File Definition Method 300

Figure 3:
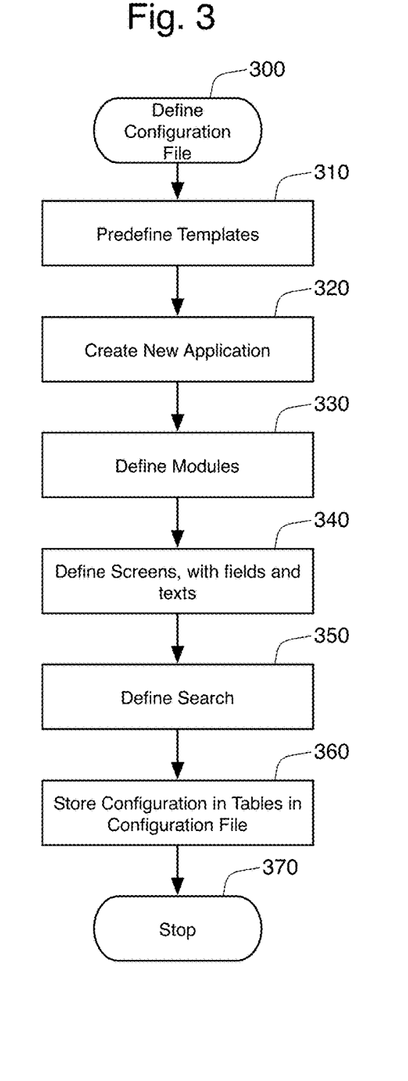
FIG. 3 is a flow chart showing a method for defining configuration data.

One possible method 300 for defining this configuration file 152 is shown in FIG. 3. As explained above, a configurator interface 172 to the configuration tool 150 can be provided through a web browser 170 that accesses the gateway 144 over the network 130. Note that in at least one embodiment, the gateway 144 communicates with the configurator interface 172 directly over the network 130 without having to pass communications over the mobile services platform 146. To simplify the task of configuring access to the data 110, it is possible to provide administrative users with templates. These templates can be predefined for commonly used modules 220, with relevant screens 230, fields 240, texts 250, and searches 260 already being populated inside the template module 220. Because business applications 142 (such as SAP's ECC) are widely used, standard templates can be developed that can be frequently used with modest modifications. With predefined templates, an administrative user simply pulls copies a module 220 from the template into their own application 210, and then customizes the elements of that module 220 as the desire. Of course, a user is always free to define their own modules 220, screens 230, and fields 240 completely from scratch. The creation of templates is the first step 310 in method 300. Generally, template creation is not accomplished by the user that wishes to define a new application, but is done either by a commercial software provider or by an administrator/programmer working for an entity. Of course, individual users can create their own applications 210 from scratch and save these applications 210 and component modules 220 as new templates.

In most cases, an individual user will start the process of creating a configuration file by defining a new application 210 at step 320 (rather than by first defining a template in step 310). The present application discloses two different configurator interfaces 172 for defining the application 210 and its related components 200, namely the table-based interface shown in FIGS. 7 and 8, and the drag-and-drop interface shown in FIGS. 9, 10, and 11. Regardless of the interface used, the new application 210 can be based upon a template defined in step 310, or can be created from scratch. As part of step 320, the user must assign values to various parameters for their application 210, such as the application's name and description.

After assigning these parameters, the user adds one or more modules 220 to the application 210 in step 330. These modules 220 can also be taken from the templates defined in step 310, or can be created from scratch. As was the case in defining a new application 210, the process of creating a module 220 requires defining the parameters associated with the module, such as the module's name and type. Furthermore, it is possible to define default formatting parameters (such as date formatting instructions), security and approval standards for changing data, and synchronization settings (that allow off-line data changes to be synchronized with a central database) for the module 220. In some embodiments, an application 210 will consist only of screens 230 and not individual modules 220. In these embodiments, step 330 can be skipped.

After defining at least one module 220, the user will then define one or more screens 230 for the module 220 (step 340). A screen 230 is a user interface screen that will appear on the mobile device 120 that is running the mobile app 160 and the desktop web browser app 174. Each screen 230 will include one or more data fields 240 that are associated with data in the database 110. These fields 240 are also defined in step 340. The data fields must be mapped to particular data elements in the business application 142 and its database 110. This mapping is frequently accomplished through pre-defined templates to make it easier for an unsophisticated user to configure and modify an application without necessarily knowing the details of how the data is maintained and stored by the business application 142. Step 340 also allows for the defining of various text elements 250 and other interface settings 260 that may appear on, or define components of, the screen 230. Finally, it is also possible to define a search interface 270 for a screen 230, which is done in step 350. The search interface 270 is used by users to search for or request a subset of data for display on screen 230.

Once the user has finished defining the modules 220, screens 230, fields 240, text elements 250, interface elements 260, and search interfaces 270 for their application 210, the configuration tool 150 will store this information in the configuration file 152. The configuration file 152 is used in method 500 (described below) to provide a user interface to the user of the mobile application 160 or the desktop web browser app 174. One benefit of using a configuration file 152 on the gateway 144 to define this user interface is that administrator can make changes to the configuration file 152 and have those changes take immediate effect on the mobile application 160 and the desktop web browser app 174 simultaneously. This is true even after a configuration for the application 210 has already been created and stored in the configuration file 152. For example, using the configurator interface 172 an administrator may alter an existing configuration to:
- add, customize, and rearrange fields 240, and map newly added fields 240 with any data fields in the database 110;
- alter field level security;
- define default field values and enable field value description;
- modify user interface field types, such as a text box or drop down field;
- define mandatory, optional or display/hidden fields 240;
- change business logic with posting and retrieval of code exits 143;
- modify application security;
- add new screens and screen transitions;
- create new modules with dedicated screens;
- enable and disable modules; and
- add and customize search criteria to be displayed in the application;

Configuration File 150

Figure 4:
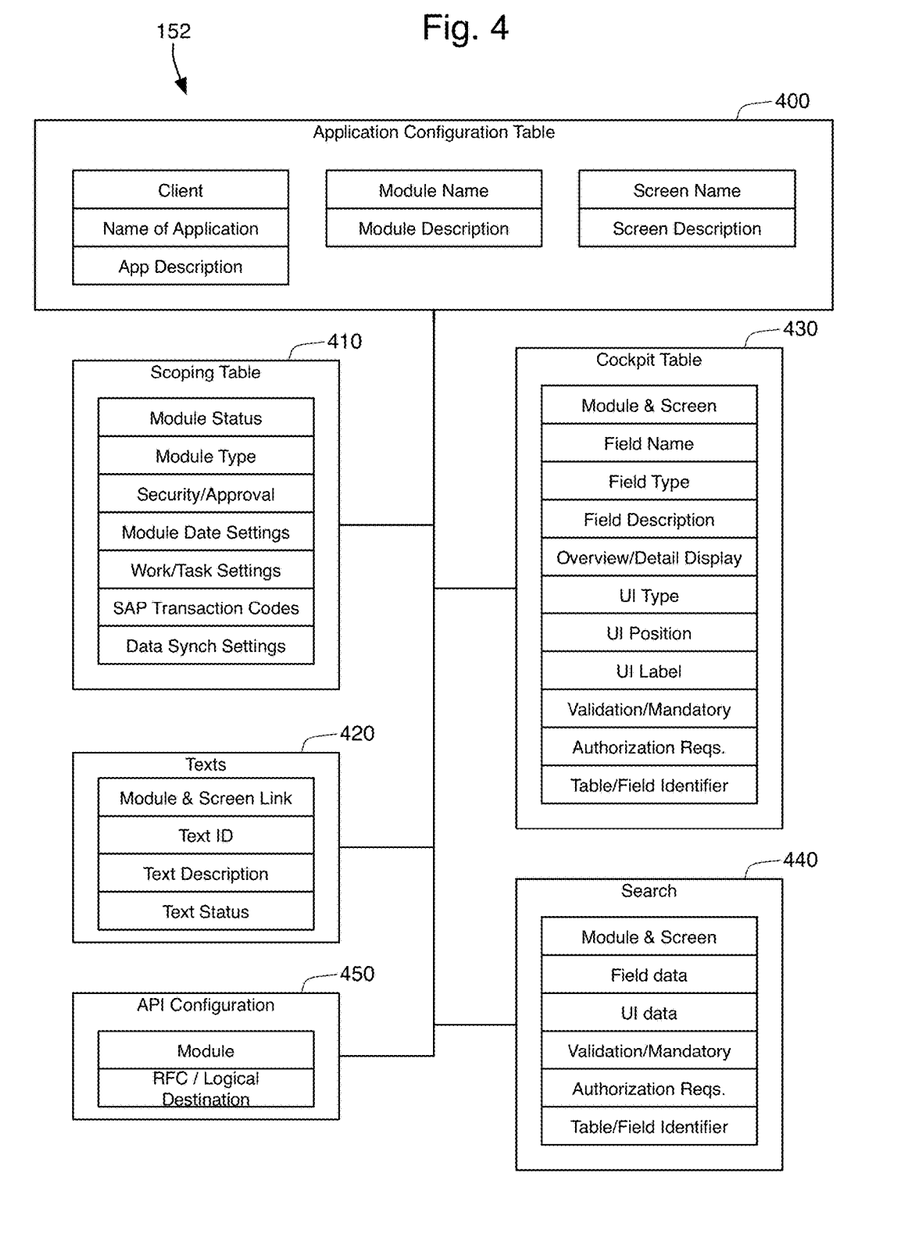
FIG. 4 is a schematic diagram showing one embodiment of configuration data stored in configuration tables.

In one embodiment, the configuration file 152 takes the form of a plurality of data tables 400, 410, 420, 430, 440, and 450, as shown in FIG. 4. However, one of ordinary skill would understand that the exact form of the tables and fields of the configuration file 152 shown in FIG. 4 do not need to be duplicated to implement the present invention. Other arrangements of data fields and other table definitions could similarly store the configuration information for a desktop web browser app 174 and mobile application 160.

Each of the tables 400, 410, 420, 430, 440, and 450, shown in FIG. 4 are linked together to define a configuration for the desktop web browser app 174 and the mobile application 160. As such, these tables store information about applications 210, modules 220, screens 230, screen components (such as fields 240, texts 250, and interface elements 260), and search interfaces 270. In FIG. 4, the Application and Module Configuration table 400 contain the following fields: Client (the client identifier), Application Name and Application Description (the name and description for the application), Module Name and Module Description (the name and description for the module), Screen Name and Screen Description (the name and description for the screen).

The Scoping Table 410 contains information about the activation and deactivation of specific modules 220 for a particular application 210. These modules 220 can also include SAP transaction codes, which can be activated or deactivated, based on customer specific business requirements. It also provides the ability to configure data synchronization settings at the enterprise level. Data synchronization is important to allow the desktop web browser app 174 and the mobile application 160 to receive changes to existing fields and to receive new data intended for storage in database 110. The desktop web browser app 174 and the mobile application 160 may be used in environments where the network connection 130 is intermittent. The application 160 can cache new data and data updates when there is no connectivity over the network 130, and then synchronize the cached data with the database 110 when connectivity is restored. The manner in which this data is synchronized for a module 220 can be defined through the configurator interface 172 and stored in the configuration file 152. The fields of this scoping table 410 include Client (the client identifier), Application Name and Application Description (the name and description for the application), Application Identifier (the internal identifier used for the application), Module Status (whether the module is enabled or disabled for the application), Work Approval fields (whether work is approved at the header or item level, whether multiple work item approval is enabled for a work item, and whether work items can be forwarded to another user), Data Synchronization (specifying the type of data synchronization for off-line data alterations, and the push interval), and Date Format (the date format for the module).

The Text Configuration Table 420 allows users to access transaction documents texts through the desktop browser web app 174 and mobile app 160. For example, a purchase order document may include "Terms & Conditions" that could be specified in an entry in this Texts table 420. Using the information in the Texts table 420, administrative users can add, edit, activate, deactivate and remove text 250 for individual users or groups of users. The text elements 250 will have configurable properties to enable users to make appropriate adjustments when required. The fields of the text table 420 include linking fields to link the text to an application, module, and screen, a Text ID (an identifier for the text), a Text Description (description of the text), and Active (whether the text is enabled for a screen).

The Cockpit Configuration Table 430 specifies field information, and identifies the fields 240 that will appear on the different screens 230 of the modules 220. The fields 240 can be specified with configurable properties to satisfy the user's specific business requirements, such as the user interface to use for the field (such as a drop-down list), the location of the field 240 on the screen 230, and the label to use for the field 240. The fields of this table 430 include module and screen links; field name, type, and description (identifying and descriptive information about the field); overview/detail display (indicating whether the field will be displayed on an overview screen, a details screen, or both), UI Type (the user interface type displayed for this field, such as a drop down field, a check box field, a text box field, a date field range, a numeric field, a numeric field range, etc.), UI position (the position that the field will be displayed in screen 230 shown on the user interface on the mobile device 120), UI label (the label used for the field by the user interface), validation fields (indicating how the field will be validated, and whether the field is mandatory, and specific validation messages to be displayed to users), authorization requirements (authorization requirements and objects needed for this field), and table and field identifiers.

The Dynamic Search Configuration Table 440 allows administrative users to add, activate and deactivate search fields and filters on different screens 230 of the module 220 with configurable properties. The search table 440 includes many of the same fields as the cockpit table 430, including module and screen links, field specific fields, validation rules, and security authorization requirements.

Administrative users use the API (Application Programming Interface) Configuration Table 450 to configure the interface with the business application 142 that controls the database 110. This table 450 is used to configure the destinations within the database 110 for all applications 210 and their modules 220 to get data and metadata from the database 110.

Mobile App Method 500

Figure 5:
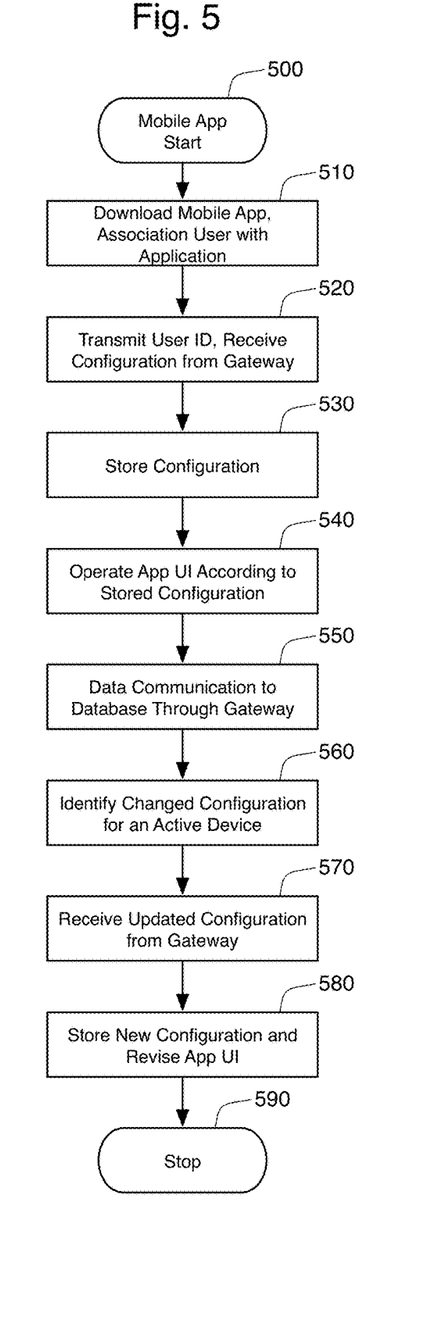
FIG. 5 is a flow chart showing a method for using configuration data to control a user interface in a mobile application.

The method 500 for configuring and operating the desktop browser web app 174 and the mobile application 160 on the mobile device 120 is shown in FIG. 5. The method 500 begins by logging into the desktop browser web app 174 or downloading the mobile application 160 to the mobile device 120 at step 510. The desktop browser web app 174 and the downloaded app 160 are not configured according the configuration found in file 152, but the app 160 may be pre-programmed to communicate with a particular database 110 that is accessed through a particular mobile platform 146, gateway 144, and business suite 142. For example, a company or other enterprise may develop a mobile application 160 that communicates only with their database 110. In this way, it is not necessary for the user of desktop browser web app 174 or the mobile device 120 to manually connect the apps 160, 174 to the database 110. The user may identified themselves to the application 160, 174, such as through the use of a username and password. Authentication of the user can be accomplished using any technique known in the prior art.

Figure 6:
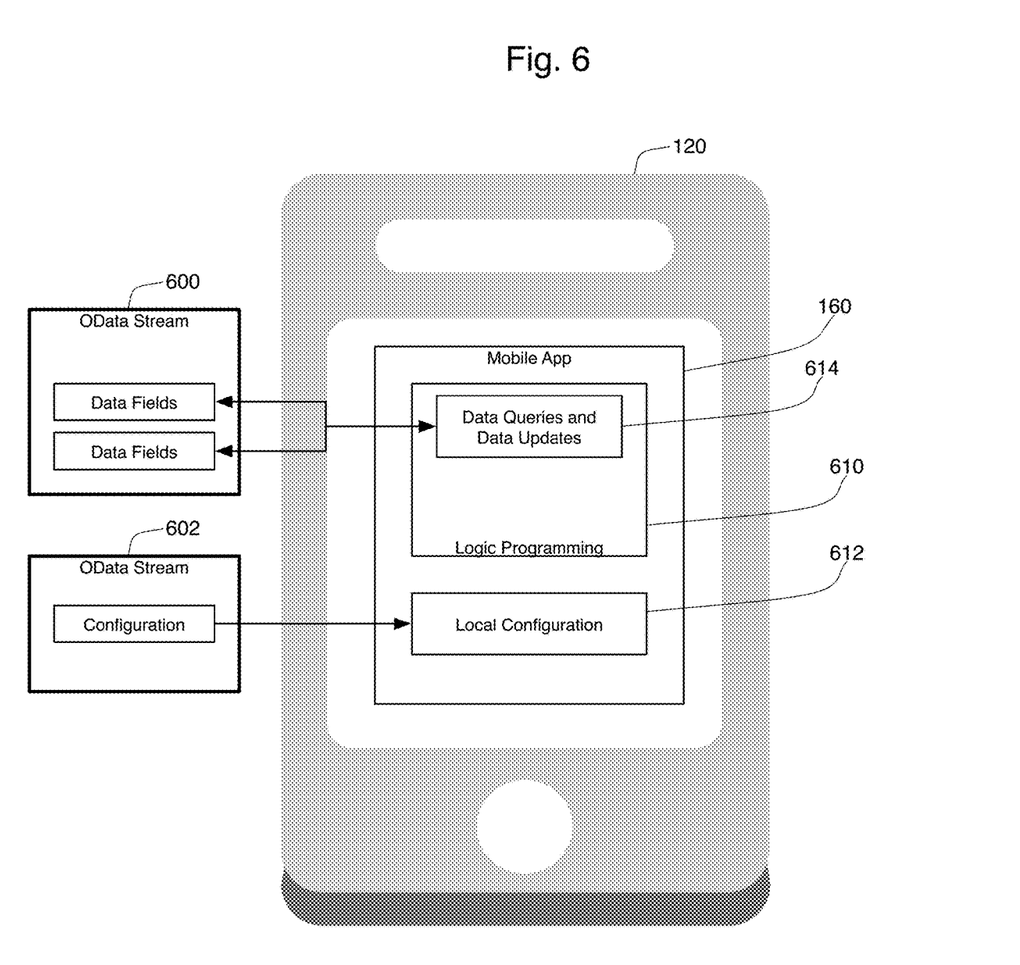
FIG. 6 is a schematic diagram showing how extension fields in an OData stream are used by engines in a mobile application to control a mobile application user interface.

As shown in FIG. 6, the mobile application 160 can be abstracted to two components, namely the logic programming 610 of the application 160 and the location configuration information 612. Although FIG. 6 shows the mobile application 160, the same division applies to the desktop browser web app 174. The logic programming 610 can include sub-logic 614 that is responsible for data queries and data updates. This sub-logic 614 is responsible for interactions with the database 110. As explained above, data communications between the mobile device 120 and gateway 144 can use a generic data communication protocol such as OData, with the communication between the gateway 144 and the business application 142 taking place through the API of the business application 142. Thus, FIG. 6 shows an OData stream 600 containing data fields that allow data communication between the database 110 and the sub-logic 614 that handles data communication in the app 160. The local configuration 612 is the configuration information that is used by the logic programming 610 to control the interface presented to the user of the mobile device 120. As explained above, the configuration information can control the modules 220, screens 230, and screen components 240, 250, 260, and 270 that are presented to the user.

Because no local configuration 612 is normally associated with the application 160, 174 when it is first downloaded, the application 160, 174 will communicate its user identification information to the gateway 144 in order to retrieve an appropriate configuration from the configuration tool 150 operating on the gateway 144. The configuration tool 150 will determine an appropriate configuration for the user identification, and return that configuration information in an OData stream 602 to the desktop browser web app 174 or the mobile device 160. This occurs in step 520 of method 500.

At step 530, the desktop browser web app 174 and mobile application 160 store the configuration information received from the gateway 144 as local configuration 612. This local configuration information 612 can then be used by the logic programming 610 to determine which modules 220, screens 230, and fields 240 (and other screen components) to present to the user, which occurs at step 540. Once the configuration information 612 is being used to control the user experience on the desktop browser web app 174 and mobile application 160, the data sub-logic 614 will initiate data communication through the server(s) 140 with the database 110 using the OData data communication protocol 600 (step 550).

As this communication passes through the gateway 144, the configuration tool 150 will identify communications occurring with this particular desktop browser web app 174 or mobile application 160. During this time, an administrative user may use the configurator interface 172 to update the configuration stored for this user in the configuration file 152. If this occurs, the configuration tool 150 will recognize the need to update the local configuration 602 on the mobile device 120 and send the revised configuration in its own OData communication 602. This occurs at step 560. When the application 160, 174 receives the revised configuration information (step 570), it stores the new configuration as location configuration 612, and then revises its own user interface accordingly (step 580). The method 500 then ends at step 590.

Configurator Interfaces 700-1100

Figure 7:
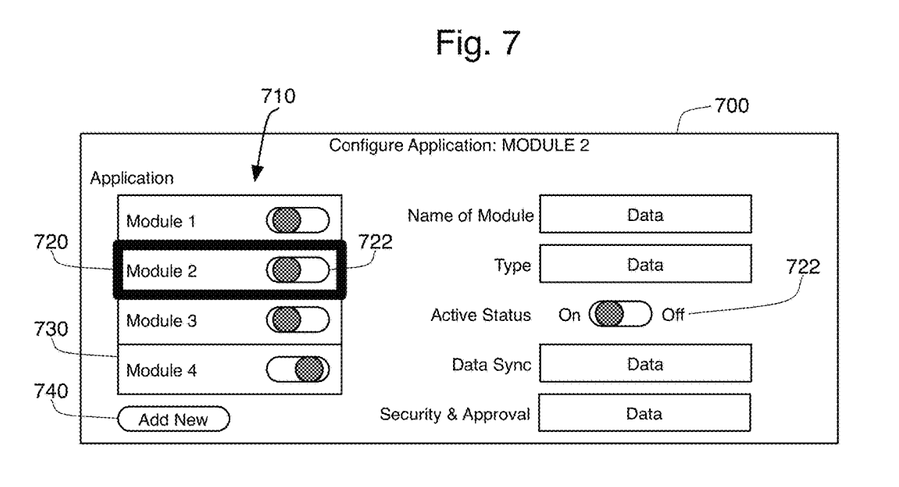
FIG. 7 is a partial screen display of a table-based user interface that allows users to determine module active status and other module-level configuration details.
Figure 8:
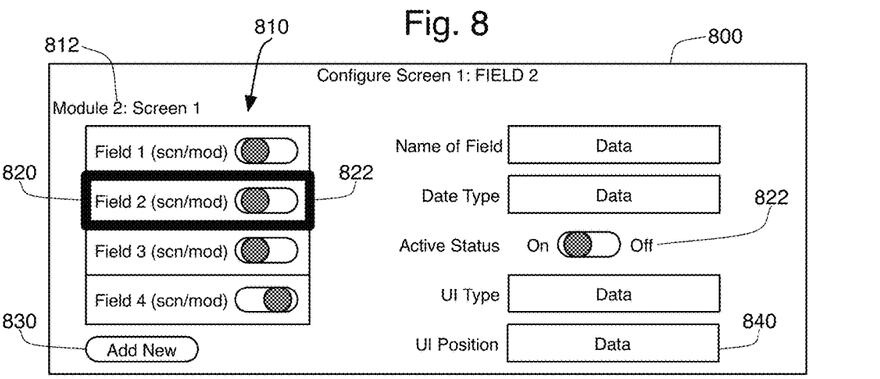
FIG. 8 is a partial screen display of a table-based user interface that allows users to alter the active status for a screen and set other field-level configuration details.

FIGS. 7 and 8 show a table-based version of the configurator interface 172. In the table-based version, the user is presented with the data input fields necessary to define an application 210, module 220, screen 230, field 240, etc., in the form of a table. In FIG. 7, for instance, information necessary to define a module 220 is presented on the right-hand side of interface 700. FIG. 7 shows that a user may need to indicate the name of the module, the type of the module, the active status of the module (in the context of the current application 210), the data sync settings for the module, and the security and approval settings for the module. The fields defining these settings shown in FIG. 7 are exemplary, and additional settings may be presented through the interface 700. Each of these separate fields provide data that is used to define the setting for the currently selected module. In this case, all the modules 220 that may be used in a particular application 210 are presented in a list 710 on the left-hand side of interface 700. This list shows four modules, with module 2 (720) being highlighted to indicate that the details concerning module 2 are presented on the right-hand side of interface 700. It is frequently the case that an administrator simply wishes to turn on or off an entire modules 220 when modifying an application for a particular user. Turning off the module 220 requires that the administrator change its active status from on to off. The active status for the modules are indicated with a slider interface in FIG. 7 and are presented next to the name of each module in the module list 710. For module 2, the active status slider interface is identified as figure element 722. Note that the active status 722 for module 2 is presented both in the module list 710 and the list of data items for this module 720 presented on the right-hand side of interface 700. The modules listed in list 710 are those modules 220 that are currently defined for the application 210. Note that module 4 (730) is listed in interface 700 even though it is not currently active for the user or users being configured. Button 740 can be used to define a new module for this application.

FIG. 8 shows a similar table-based configurator interface 172, this time presenting an interface 800 for a field definition. The list of fields 810 is presented on the left side of interface 800, with the data that defines settings for one of the fields being shown on the right. Note that fields 240 are generally associated with particular screens 230, which are in turn associated with particular modules 220. Thus, the field list 810 may be a list of fields 240 that are available for a single screen 230, as shown in label 812 (screen 1 of module 2). Alternatively, all fields 240 for any of the screens 230 in the modules 220 can be presented, in which case it is necessary to specifically label the screen associated with that field definition in list 810. If the list 810 shows all fields in an application, the field list 810 would need to identify the particular screen and module that is associated with each field definition. The active status of a field 822, like the active status 722 of FIG. 7, is shown in two places in interface 800. This assists the administrator in making it easy to identify which fields are being shown in the user interface being defined, and makes it easy to activate or deactivate a field as desired. The add new button 830 make it possible to create and define new fields 240 for a screen 230. Note that in one embodiment, the UI position field 840 is a simple integer, which indicates the ordinal position of this field 240 relative to other fields 240 on the screen 230. The logic programming 610 of the desktop browser web app 174 and mobile application 160 is responsible for examining the position fields 840 of all fields to be displayed and then presenting the fields in the appropriate order.

Figure 9:
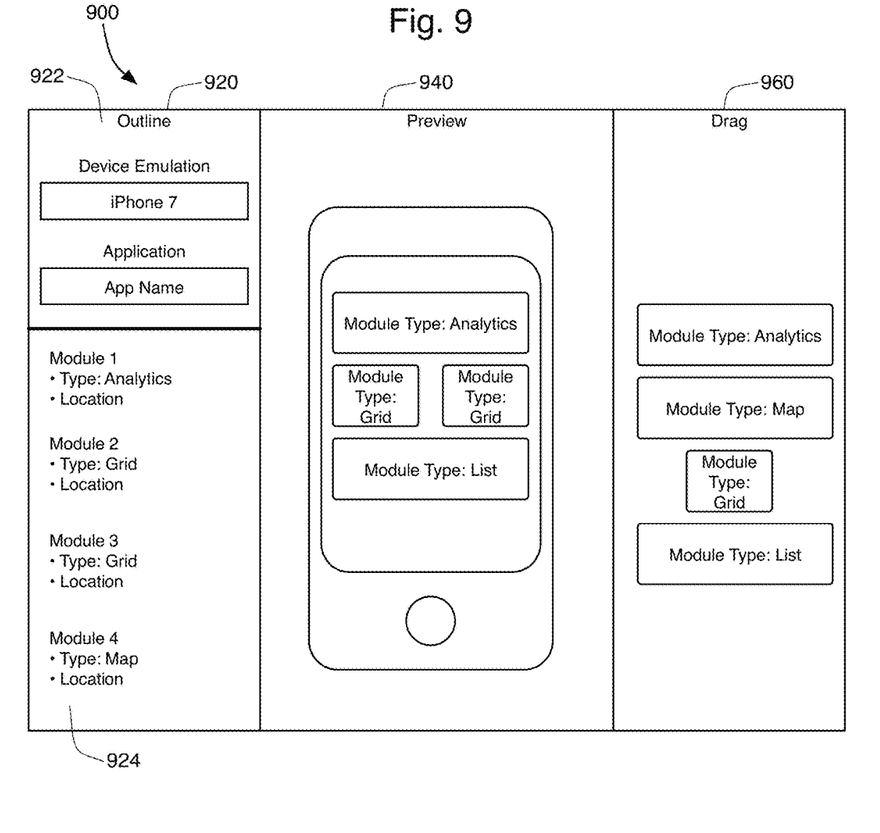
FIG. 9 is a partial screen display of a drag-and-drop user interface that allows user to select and arrange modules for an application

FIG. 9 shows a drag-and-drop interface 900 for defining the modules 220 in an application 210. This drag-and-drop interface is shown with three primary components that roughly divide the screen into thirds. The left component 920 has a top half 922 that defines the mobile device being emulated (an iPhone 7) and the application being defined. The lower half 924 presents an outline of the various modules 220 that make up the application 210 being defined. The middle component 940 of the interface 900 is the preview component, which shows a preview of how the various modules 220 will be presented to the user when first viewing the modules 220 of this application 210. The right-hand component 960 is the module storage area that presents the various modules 220 that may be dragged onto the preview area 940. With the interface shown in FIG. 9, a user can select from four types of modules: an analytics module, a map module, a grid module, and a list module. These module types are used to present different types of information from the database 110, or to present the same data using different techniques. For instance, address information can be presented through a list of addresses using the list module type, or through a graphical map using the map module type. An analytics module can be used to present data on a visual graph, while a grid will present rows and columns in a grid format. An administrative user wishing to add a module 220 to an application 210 will simply drag the module from interface component 960 onto a particular location in the preview component 940. Once added to the preview, basic information about the added module will appear on the outline 924.

Figure 10:
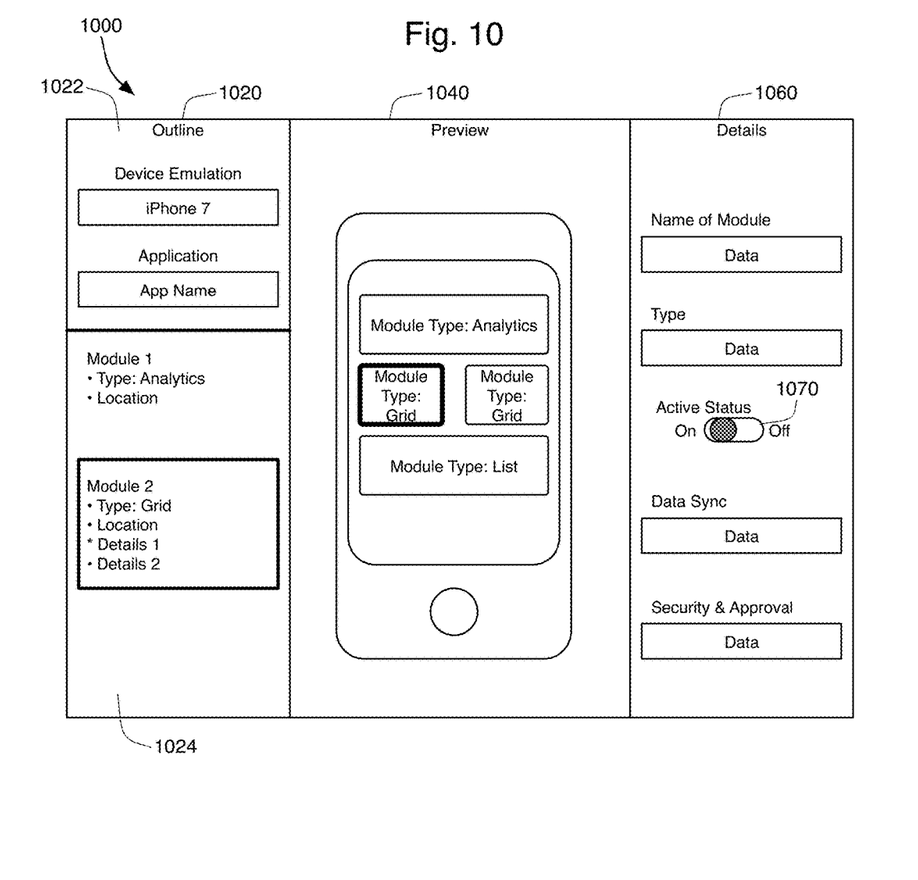
FIG. 10 is a partial screen display of a drag-and-drop user interface that allows users to determine module active status and other module-level configuration details.

To define the details of one of the selected modules, a user can select a module from the preview component 940 or the outline 924. When this occurs, interface 1000 shown in FIG. 10 is presented. This interface 1000 is similar to interface 900, but the selected module is now highlighted in the preview 1040 and outline 1024 components of the interface 1000, and the right-hand component 1060 now shows details concerning the selected module. These module details can be similar to those details shown on the right-hand side of the table interface 700 shown in FIG. 7.

As explained above, every module 220 consists of one or more screens 230 that contain fields 240, predefined texts 250, and other user interface elements 260. In the drag-and-drop interface 1100 shown in FIG. 11, these elements can be selected and configured graphically. The left-hand side 1120 of the interface 1100 has an upper component 1122 that provides information about the screen 230 being defined, and the module 220 that contains that screen 230. This component 1122 may also display the mobile device being emulated and the name of the application being defined, as was the case in FIGS. 9 and 10. In one embodiment, the active status 1110 of this screen for this module is also shown in this component 1122.

The lower half of the left-hand-side 1120 contains an outline 1124 that lists, in outline form, the various component elements 240, 250, 260 that make up the screen. These elements are presented and arranged graphically on the middle preview component 1140 of interface 1100. The various elements that might be added to the preview component 1140 are set forth on the right-hand component 1160 of the interface 1100. An administrative user can add a new field in the form of a text box or drop-down list by dragging the appropriate element from component 1160 onto the preview component 1140. Elements on the preview component 1140 can be rearranged by dragging the element to a new position. Elements can be removed by dragging them from the preview component 1140. Details about a field or other interface element can be defined by clicking on the element in either the outline 1124 or the preview screen 1140. When this is done, the right-hand component 1160 would change to list the various data elements that define that field or interface element, such as those elements shown in the right-hand side of table interface 800 (this is not shown in FIG. 11).

Figure 11:
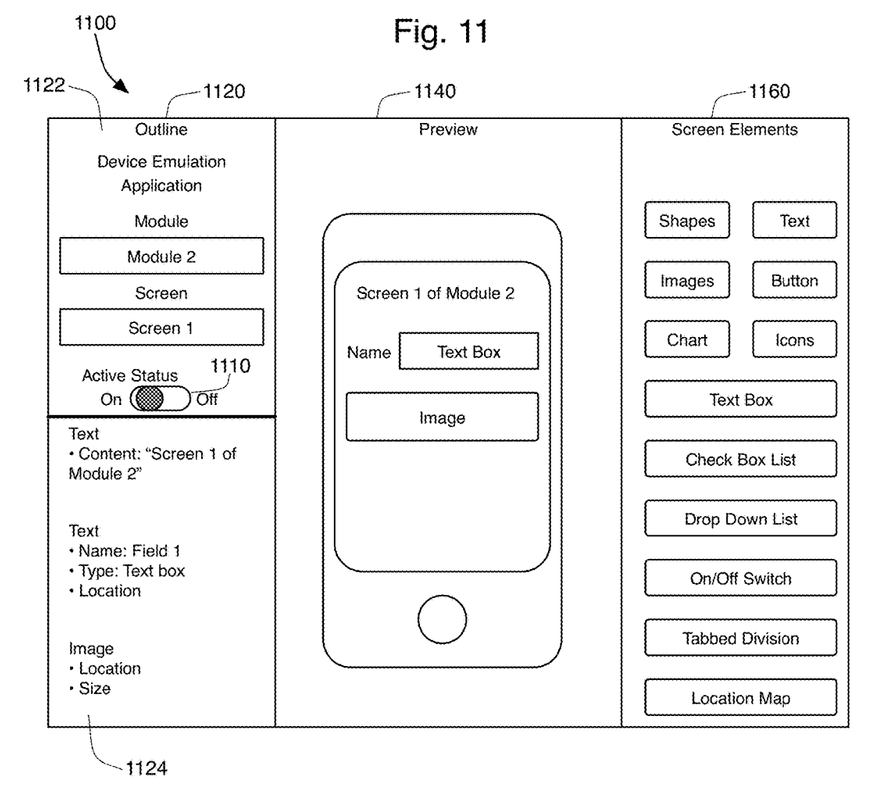
FIG. 11 is a partial screen display of a drag-and-drop user interface that allows users to select and arrange data fields and other elements for a screen display in a module.

One of ordinary skill would understand that the implementation of the drag-and-drop interface shown in FIGS. 9-11 could be altered in a variety of ways without departing from the spirit and scope of the present invention. For instance, the left-hand components 920, 1020, 1120 are not always needed, and could disappear or simply not be implemented in various scenarios to maximize the space for the middle and right-hand components. Alternatively, the elements available for dragging and dropping (shown in FIGS. 9 and 11) could be shown in place of the left-hand components, and the details about the selected element (shown in FIG. 10) could be positioned on the right-hand side. Additional navigation elements could be presented to make it easier to navigate between modules 220 and screens 230. Regardless of which variations are implemented, the configurator interfaces of FIGS. 9 through 11 show that it is possible to select, define, organize, and display the elements of an application 210, module 220, screen 230, or field 240 using a graphical, drag-and-drop interface.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for modifying a remote user interface for a database application, the method comprising:
   a) locating a configuration tool on a gateway, the gateway communicating to a database application;
   b) creating a template for a template user interface to the database application, the template having:
      i) a plurality of fields, including a first field and a second field, the plurality of fields being mapped to particular data elements in the database application,
      ii) a plurality of screens, including a first screen and second screen, the plurality of screens each being associated with a set of fields, the first screen being associated with the first field and the second field, and
      iii) a plurality of modules, including a first module and a second module, the plurality of modules each being associated with a set of screens, the first module being associated with the first screen and the second screen;
   c) receiving, at the configuration tool and through a configuration interface that provides ability to change active status for the plurality of modules, screens, and fields, first modifications to the template for a first user, the first modifications designating that the first module is active and the second module is inactive, that the first and second screens are active, and that the first and second fields are active;
d) generating, at the configuration tool, a first configuration for the first user based on the first modifications;
e) receiving a request for the first configuration from a device operated by the first user;
f) transmitting the first configuration to the device operated by the first user for the generation of a first remote user interface wherein the first remote user interface presents only active modules, screens, and fields; and
g) receiving a first data request from the first remote user interface in accordance with the first configuration.

2. The method of claim 1, further comprising:
h) receiving, at the configuration tool, second modifications to the template for a second user, the second modifications being different than the first modifications;
i) generating and storing, at the configuration tool, a second configuration for the second user based on the second modifications;
j) receiving a request for the second configuration file from a different device operated by the second user;
k) transmitting the second configuration to the different device operated by the second user for the generation of a second remote user interface; and
l) receiving a second data request from the second remote user interface in accordance with the second configuration.

3. The method of claim 1, further comprising:
h) receiving, at the configuration tool, new modifications to the template for the first user, the new modifications indicating that the second module is active;
i) generating, at the configuration tool, a new configuration for the first user based on the new modifications;
j) receiving a second data request from the first remote user interface and identifying a need to update the first remote user interface;
k) transmitting the new configuration to the first user for the generation of a new first remote user interface in which the second module is active.

4. The method of claim 1, further comprising:
h) receiving, at the configuration tool, new modifications to the template for the first user, the new modifications indicating that the first screen is active and the second screen is inactive and that the first field is active and the second field is inactive;
i) generating, at the configuration tool, a new configuration for the first user based on the new modifications;
j) receiving a second data request from the first remote user interface and identifying a need to update the first remote user interface;
k) transmitting the new configuration to the first user for the generation of a new first remote user interface wherein the new first remote user interface presents only active modules, screens, and fields.

5. The method of claim 4, wherein the first screen is further associated within the template with a plurality of text elements each having an active status and a plurality of interface elements, wherein the new modifications further alter the active status of a first text element and alters a first interface element.

6. The method of claim 5, wherein each of the plurality of modules is associated within the template with security settings and synchronization settings and wherein each field is further associated within the template with a user interface type and a user interface position, further wherein the new modification further alters the security and synchronization settings of the first module and alters the user interface type and the user interface position of the first field.

7. The method of claim 1, wherein the configuration interface lists the active status for the plurality of modules, screens, and fields.

8. A method for modifying a user interface for a mobile database application, the method comprising:
a) transmitting an identifier from the mobile database application to a configuration tool operating on a database gateway to a computerized database;
b) receiving the identifier at the configuration tool operating on the database gateway;
c) identifying, at the configuration tool, a first configuration from a configuration file appropriate for the identifier;
d) transmitting, from the configuration tool, the first configuration to the mobile database application;
e) storing, at the mobile database application, the first configuration as a local configuration;
f) using, at the mobile database application, the local configuration to determine the fields and screens that are displayed in the user interface;
g) receiving, at the database gateway, data communications between the mobile database application and the computerized database;
h) receiving, through a configurator interface at the configuration tool, a modification to the first configuration, wherein the modification for the first configuration is received from a configurator interface operating on a web browser, the modification modifying visibility of at least one of the fields and screens that are displayed in the user interface;
i) transmitting, from the configuration tool, the modification to the mobile database application;
j) storing, at the mobile database application, the modified first configuration as the new local configuration; and
k) using, at the mobile database application, the new local configuration to determine the fields and screens that are displayed in the user interface.

9. The method of claim 8, wherein the database gateway communicates via an application programming interface with a business application that manages the computerized database, and communicates via OData to the mobile database application.

10. The method of claim 8, wherein the modification includes disabling the display of screens that were enabled in the first configuration.

11. The method of claim 8, wherein the modification includes disabling the display of data fields that were enabled in the first configuration.

12. The method of claim 11, wherein the first configuration includes functional groupings of multiple screens into a plurality of modules, and further wherein the modification includes disabling at least one module that was enabled in the first configuration.

13. The method of claim 12, wherein the first configuration is stored in a plurality of database tables.

14. The method of claim 8, wherein the configuration tool manages a plurality of configurations for the mobile database application, with each separate configuration being associated with at least one identifier.

15. The method of claim 8, wherein the configuration tool manages configurations for a plurality of mobile database applications.

16. A computerized system that modifies a user interface for a mobile database application comprising:

a) a central database;
b) a business application operating on a server computer that manages the central database;
c) a gateway in digital communication with the central database using an application programming interface of the business application;
d) a mobile device in network communication with the gateway;
e) a configuration tool operating on the gateway, the configuration tool organizing and storing a configuration file comprising a first configuration, wherein the configuration tool provides a remote configurator interface that makes a modification to the first configuration stored in the configuration file to create a modified first configuration, the modification modifying visibility in the user interface of at least one member of a set consisting of a field, a screen, and a module; and
f) the mobile device application operating on the mobile device, the mobile device application being programmed to:
  i) receive the modified first configuration from the configuration tool;
  ii) store the modified first configuration as a local configuration; and
  iii) use the local configuration to create the user interface for the mobile device application.

17. The system of claim 16, wherein the first configuration identifies fields on a first screen, wherein the modification to the first configuration alters which fields are displayed on the first screen.

18. The system of claim 17, wherein the first configuration identifies multiple screens to be used in the user interface for the mobile device application, wherein the modification to the first configuration alters which screens are displayed in the user interface.

19. The system of claim 18, wherein the first configuration identifies multiple modules to be used in the user interface for the mobile device application, wherein each module comprises a plurality of screens, further wherein the modification to the first configuration alters which modules are displayed in the user interface.

20. The system of claim 16, wherein the configuration tool identifies the modification to the first configuration and transmits the modification to the mobile device application, further wherein the mobile device application stores the modification to the local configuration and uses the modified local configuration to create the user interface for the mobile device application.

* * * * *